(12) United States Patent
Kim et al.

(10) Patent No.: US 9,344,912 B2
(45) Date of Patent: May 17, 2016

(54) METHOD AND APPARATUS FOR TRANSCEIVING NEIGHBOR NETWORK INFORMATION IN WIRELESS COMMUNICATION SYSTEM

(71) Applicant: LG Electronics Inc., Seoul (KR)

(72) Inventors: Eunsun Kim, Gyeonggi-do (KR); Yunjung Yi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 14/355,912

(22) PCT Filed: Nov. 6, 2012

(86) PCT No.: PCT/KR2012/009266
§ 371 (c)(1),
(2) Date: May 2, 2014

(87) PCT Pub. No.: WO2013/069941
PCT Pub. Date: May 16, 2013

(65) Prior Publication Data
US 2014/0293949 A1    Oct. 2, 2014

Related U.S. Application Data

(60) Provisional application No. 61/556,816, filed on Nov. 7, 2011.

(51) Int. Cl.
*H04W 28/02* (2009.01)
*H04W 74/00* (2009.01)
(Continued)

(52) U.S. Cl.
CPC .......... *H04W 28/0263* (2013.01); *H04W 16/14* (2013.01); *H04W 24/02* (2013.01); *H04W 28/0257* (2013.01); *H04W 48/16* (2013.01); *H04W 74/002* (2013.01)

(58) Field of Classification Search
None
See application file for complete search history.

(56) References Cited

U.S. PATENT DOCUMENTS

2009/0116448 A1    5/2009    Nam et al.
2011/0075586 A1    3/2011    Hu et al.
(Continued)

FOREIGN PATENT DOCUMENTS

KR    10-2009-0044740 A    5/2009
KR    10-2010-0108496 A    10/2010

OTHER PUBLICATIONS

International Search Report issued in corresponding International Patent Application No. PCT/KR2012/009266 dated Mar. 27, 2013.
(Continued)

*Primary Examiner* — Ashley Shivers
(74) *Attorney, Agent, or Firm* — Morgan, Lewis & Bockius LLP

(57) ABSTRACT

The present invention relates to a wireless communication system, and more specifically, to a method and an apparatus for transceiving neighbor network information. A method for a first station (STA) to provide neighbor network information to a second STA, according to one embodiment of the present invention, comprises the steps of: receiving a request frame for neighbor network information from the second STA; and transmitting a response frame for neighbor network information to the second STA, wherein the request frame for neighbor network information can comprise at least one item of information about the second STA from among the address, estimated transmission strength, and location.

14 Claims, 12 Drawing Sheets

| | Info ID | Length | Requester STA address | Operating Class | Channel number | Transmit power | Location |
|---|---|---|---|---|---|---|---|
| Octets: | 2 | 2 | 6 | 1 | 1 | 1 | Variable (optional) |

(a)

These fields are repeated as determined by the length field

| | Info ID | Length | Requester STA address | Status Code | BSSID | TVBD device type | Operating Class | Operating transmit power | Relative Path Loss | Channel Load |
|---|---|---|---|---|---|---|---|---|---|---|
| Octets: | 2 | 2 | 6 | 1 | 6 | 1 | 1 | 1 | 1 | 1 |

(b)

(51) Int. Cl.
*H04W 16/14* (2009.01)
*H04W 48/16* (2009.01)
*H04W 24/02* (2009.01)

(56) References Cited

U.S. PATENT DOCUMENTS

| | | | |
|---|---|---|---|
| 2011/0194542 A1* | 8/2011 | Kim et al. | 370/338 |
| 2011/0286401 A1 | 11/2011 | Wijting et al. | |
| 2012/0230247 A1* | 9/2012 | Kwon et al. | 370/315 |
| 2014/0086212 A1* | 3/2014 | Kafle et al. | 370/331 |

OTHER PUBLICATIONS

Written Opinion of the International Searching Authority dated Mar. 27, 2013, issued in International Application No. PCT/KR2012/009266.

* cited by examiner

FIG. 7

| Element ID | Length | Advertisement Protocol Tuple #1 | Advertisement Protocol Tuple #2 (optional) | Advertisement Protocol Tuple #n (optional) |
|---|---|---|---|---|
| 1 | 1 | Variable | Variable | Variable |

Octets:

(a)

| B0 - B6 | B7 | |
|---|---|---|
| Query Response Length Limit | PAME-BI | Advertisment Protocol ID |
| 1 | | Variable |

Octets:

| Info ID | Length | Query type |
|---|---|---|
| 2 | 2 | 1 |

Octets:

(a)

| Info ID | Length | Operating Class | Channel number | Maximum transmit power | Location (optional) |
|---|---|---|---|---|---|
| 2 | 2 | 1 | 1 | 1 | Variable |

Octets:

| Info ID | Length | Requester STA address | Operating Class | Channel number | Transmit power | Location |
|---|---|---|---|---|---|---|
| Octets: 2 | 2 | 6 | 1 | 1 | 1 | Variable (optional) |

(a)

| Info ID | Length | Requester STA address | Status Code | BSSID | TVBD device type | Operating Class | Operating transmit power | Relative Path Loss | Channel Load |
|---|---|---|---|---|---|---|---|---|---|
| Octets: 2 | 2 | 6 | 1 | 6 | 1 | 1 | 1 | 1 | 1 |

These fields are repeated as determined by the length field (b)

US 9,344,912 B2

METHOD AND APPARATUS FOR TRANSCEIVING NEIGHBOR NETWORK INFORMATION IN WIRELESS COMMUNICATION SYSTEM

TECHNICAL FIELD

The following descriptions relate to a wireless communication system and, more specifically, to a method and apparatus for transmitting/receiving neighboring network information.

BACKGROUND ART

Wireless Local Area Network (WLAN) technology standards are established as IEEE (Institute of Electrical and Electronics Engineers) 802.11 standards. IEEE 802.11a and 11b respectively provide maximum data rates of 11 Mbps and 54 Mbps using unlicensed bands of 2.4. GHz and 5 GHz. IEEE 802.11g adopts OFDM (Orthogonal Frequency Divisional Multiplexing) and provides a data rates of 54 Mbps at 2.4 GHz. IEEE 802.11n adopts MIMO-OFDM and provides a data rate of 300 Mbps for 4 spatial streams. IEEE 802.11n supports up to 40 MHz channel bandwidth and provides a maximum data rate of 600 Mbps.

A communication scheme in which operation of an unlicensed user is permitted in a frequency band defined for a licensed user is under discussion. A frequency band which is not used by a licensed user temporarily can be referred to as a whitespace and, particularly, a whitespace in a TV band can be referred to as a TV whitespace (TVWS).

IEEE 802/11af standard for defining operations of unlicensed devices in the TVWS band is currently under development.

TVWS includes VHF (Very High Frequency) bands (54 to 60, 76 to 88 and 174 to 216 MHz) and UHF (Ultra High Frequency) bands (470 to 698 MHz) allocated for TV broadcast and refers to a frequency band permitted for use by an unlicensed device under the condition that communications of licensed devices (devices for TV broadcast, wireless microphones, etc.) operating in the corresponding frequency bands are not hindered.

While operations of all unlicensed devices are permitted in the range of 512 to 608 MHz and 614 to 698 MHz except for some special cases, 54 to 60 MHz, 76 to 88 MHz, 174 to 216 MHz and 470 to 512 MHz are permitted for communication between fixed devices only. A fixed device refers to a device performing transmission at a fixed location only. In the following description, while the TVWS band includes the above-mentioned TVWS, the present invention is not limited thereto.

An unlicensed device that wants to use TV whitespace band needs to provide a licensed device protection function. Accordingly, the unlicensed device must check whether a licensed device occupies the corresponding TV band before starting transmission in the TV whitespace band. That is, the unlicensed device is permitted for use in the whitespace band only when the licensed device is not used in the whitespace band.

To achieve this, the unlicensed device needs to access a geo-location database (GDB) through the Internet or a dedicated network to obtain information about a list of channels available in a corresponding area. The GDB stores and manages information about licensed devices registered therein and information about channels dynamically changed according to geographical positions of the licensed devices and time for which the licensed devices are used. To solve a problem of coexistence of unlicensed devices using the whitespace, a signaling protocol such as a common beacon frame and a spectrum sensing mechanism can be used.

In IEEE 802.11, a TVWS terminal can refer to an unlicensed device operating in the TVWS spectrum using an IEEE 802.11 medium access control (MAC) layer and physical (PHY) layer. In the specification, a station (STA) refers to a TVWS terminal operating in the TVWS spectrum unless otherwise mentioned.

STA needs to provide a function of protecting an incumbent user or a primary user allowed to perform incumbent access including a licensed user (TV user, wireless microphone, etc.). That is, when an incumbent user is using the TVWS, STA has to stop use of the TVWS. Accordingly, STA needs to detect an available channel (channel that is not used by licensed devices) that can be used by unlicensed devices and operate in the available channel.

STA can detect an available channel through spectrum sensing mechanism or by accessing the GDB to determine a TV channel schedule. Energy detection (method of determining that an incumbent user is using TVWS when the intensity of a received signal is higher than a predetermined value) and feature detection (method of determining that an incumbent user is using TVWS when a digital TV preamble is detected) can be used as the spectrum sensing mechanism. In addition, STA needs to access the GDB to acquire GDB information based on the position thereof to check whether a licensed device uses a channel in the position. STA should access the GDB and acquire the information with sufficient frequency to protect the licensed device.

When it is determined that an incumbent user is using a channel immediately adjacent to the currently used channel through the spectrum sensing mechanism or GDB, a terminal (or STA) and a base station (or access point (AP)) can protect the incumbent user by reducing transmit power.

DISCLOSURE

Technical Problem

When many devices operate in a whitespace band, operation of the devices must be coordinated. To achieve this, neighboring network information of the devices needs to be used. However, a method of using neighboring network information is not defined in conventional systems.

An object of the present invention devised to solve the problem lies in a method for supporting coexistence and correct operations of devices in a whitespace band using neighboring network information.

The technical problems solved by the present invention are not limited to the above technical problems and those skilled in the art may understand other technical problems from the following description.

Technical Solution

The object of the present invention can be achieved by providing a method for a first station (STA) to provide neighboring network information (NNI) to a second STA, the method including: receiving an NNI request frame from the second STA; and transmitting an NNI response frame to the second STA, wherein the NNI request frame includes at least one of the address of the second STA, estimated transmit power of the second STA and the location of the second STA.

In another aspect of the present invention, provided herein is a method for a second STA to receive NNI from a first STA, the method including: transmitting an NNI request frame to the first STA; and receiving an NNI response frame from the first STA, wherein the NNI request frame includes at least one of the address of the second STA, estimated transmit power of the second STA and the location of the second STA.

In another aspect of the present invention, provided herein is a first STA providing NNI to a second STA, including: a transceiver configured to perform transmission/reception to/from other devices; and a processor configured to control the first STA comprising the transceiver, wherein the processor is configured to receive an NNI request frame from the second STA using the transceiver and to transmit an NNI response frame to the second STA using the transceiver, wherein the NNI request frame includes at least one of the address of the second STA, estimated transmit power of the second STA and the location of the second STA.

In another aspect of the present invention, provided herein is a second STA receiving NNI from a first STA, including: a transceiver configured to perform transmission/reception to/from other devices; and a processor configured to control the second STA comprising the transceiver, wherein the processor is configured to transmit an NNI request frame to the first STA using the transceiver and to receive an NNI response frame from the first STA, wherein the NNI request frame includes at least one of the address of the second STA, estimated transmit power of the second STA and the location of the second STA.

The following is commonly applicable to the aforementioned embodiments of the present invention.

The NNI request frame may further include information about a channel requested by the second STA.

The NNI response frame may include at least one of the address of a requester STA, a status code, a BSS ID (basic service set identifier), a device type, an operating class, a channel number, operating transmit power and relative path loss.

The method may further include receiving a neighboring network measurement response frame from the second STA.

The neighboring network measurement response frame may include at least one of the address of a requester STA, the address of a responder STA, an operating class, a channel number, a device type, BSS ID, signal-to-interference plus noise ratio of a received signal, and channel load.

The neighboring network measurement response frame may be transmitted as a response to a neighboring network measurement request frame transmitted from the first STA to the second STA.

The neighboring network measurement request frame may include at least one of the address of a requester STA, the address of a responder STA, measurement start time, a measurement duration, an operating class and a channel number.

The method may further include receiving an operating channel state response frame from the second STA.

The operation channel state response frame may include at least one of an operating class, a channel number, maximum transmit power and location.

The operation channel state response frame may be transmitted as a response to an operation channel state request frame transmitted from the first STA to the second STA, wherein the operation channel state request frame includes a query type field.

The NNI request frame and the NNI response frame may be transmitted or received using a registered location query protocol (RLQP).

The first STA may be a registered location secure server (RLSS) and the second STA may be an access point (AP).

The above description and the following detailed description of the present invention are exemplary and are for additional explanation of the invention disclosed in the claims.

Advantageous Effects

According to embodiments of the present invention, it is possible to provide a method for supporting coexistence and correct operations of devices in a whitespace band using neighboring network information. In addition, it is possible to provide a method for acquiring channel measurement information by a device operating in the whitespace band and using the same.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 7 illustrates an exemplary advertisement protocol information element format;

FIG. 9(a) illustrates an exemplary operation channel state request frame;

FIG. 9(b) illustrates an exemplary operation channel state response frame;

FIG. 10(a) illustrates an exemplary RLQP BSS information request frame;

FIG. 10(b) illustrates an exemplary RLQP BSS information response frame;

BEST MODE

Figure 1:
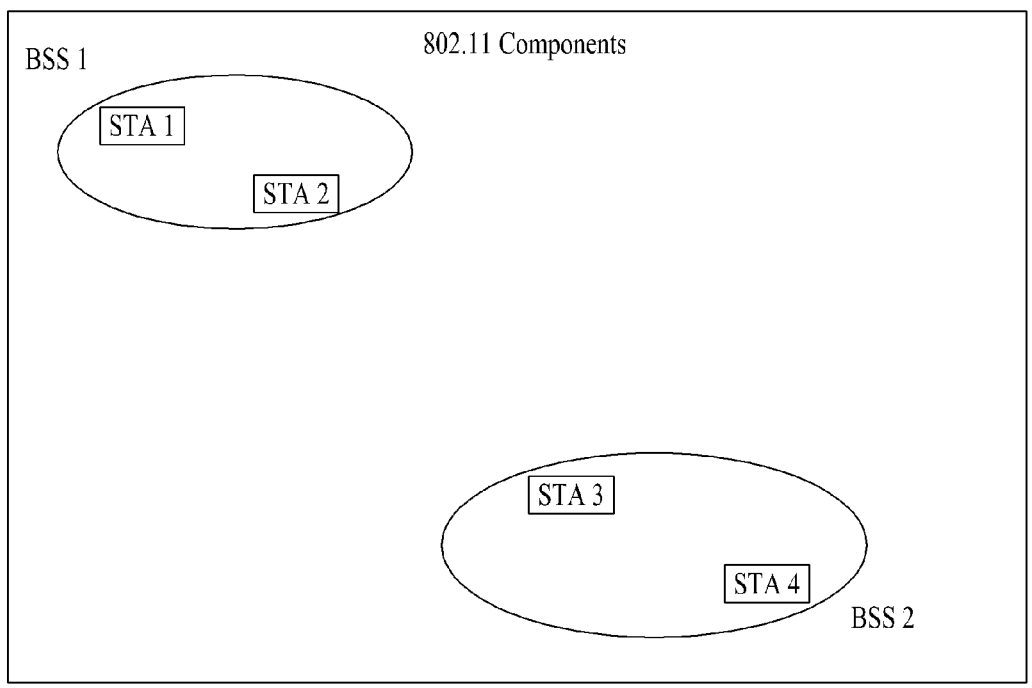
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein.

Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
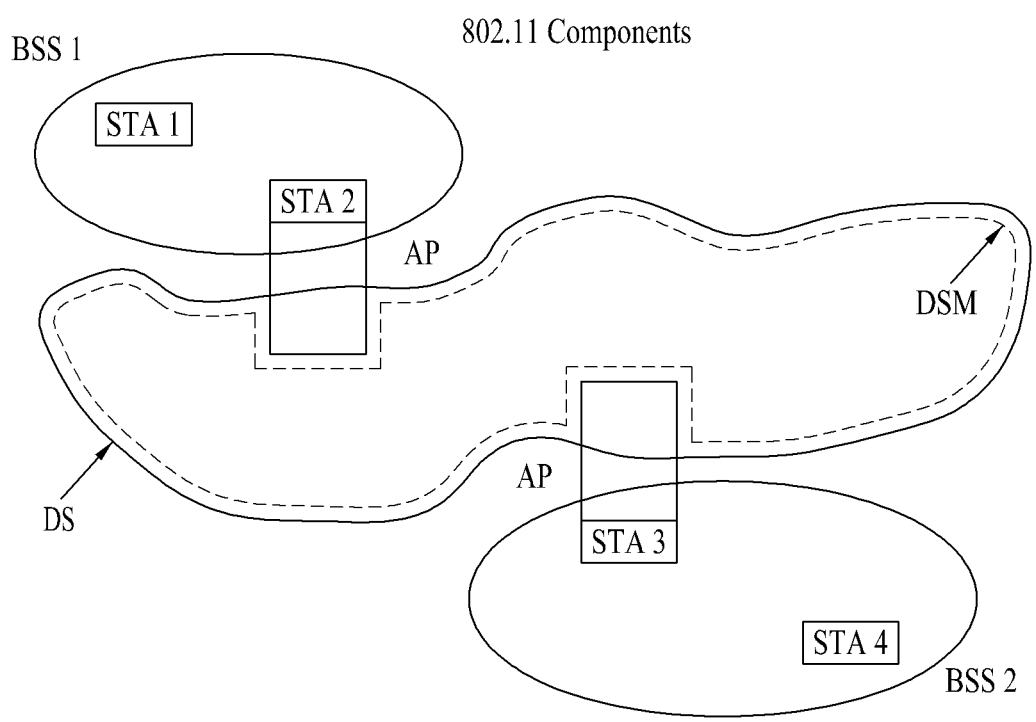
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 shown in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
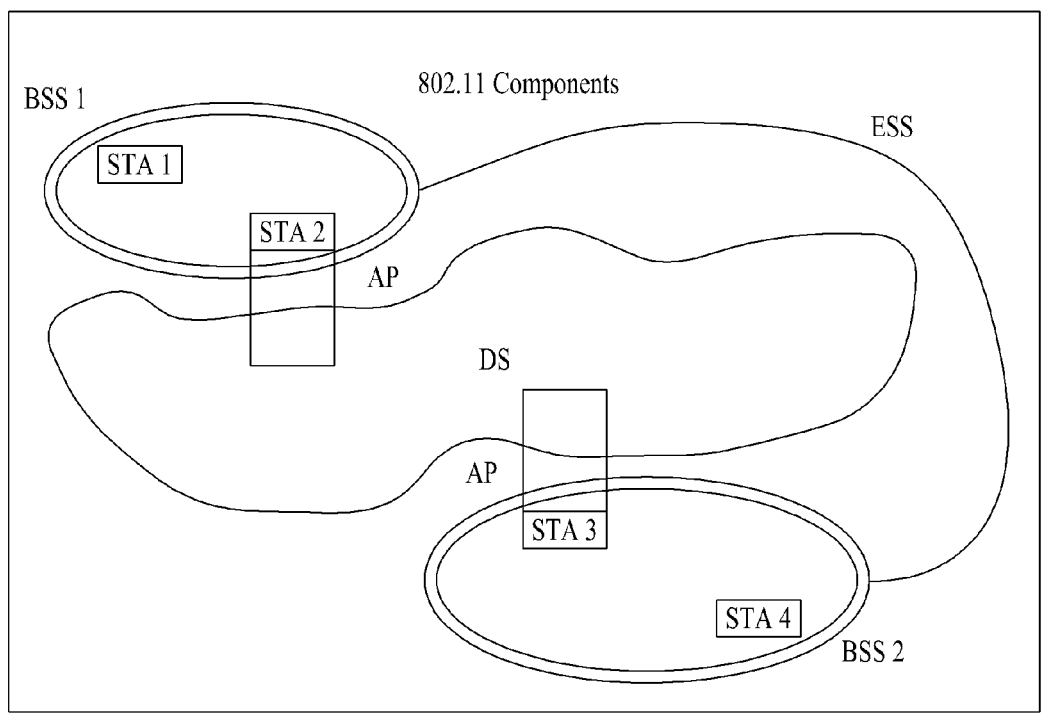
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and BSSs. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
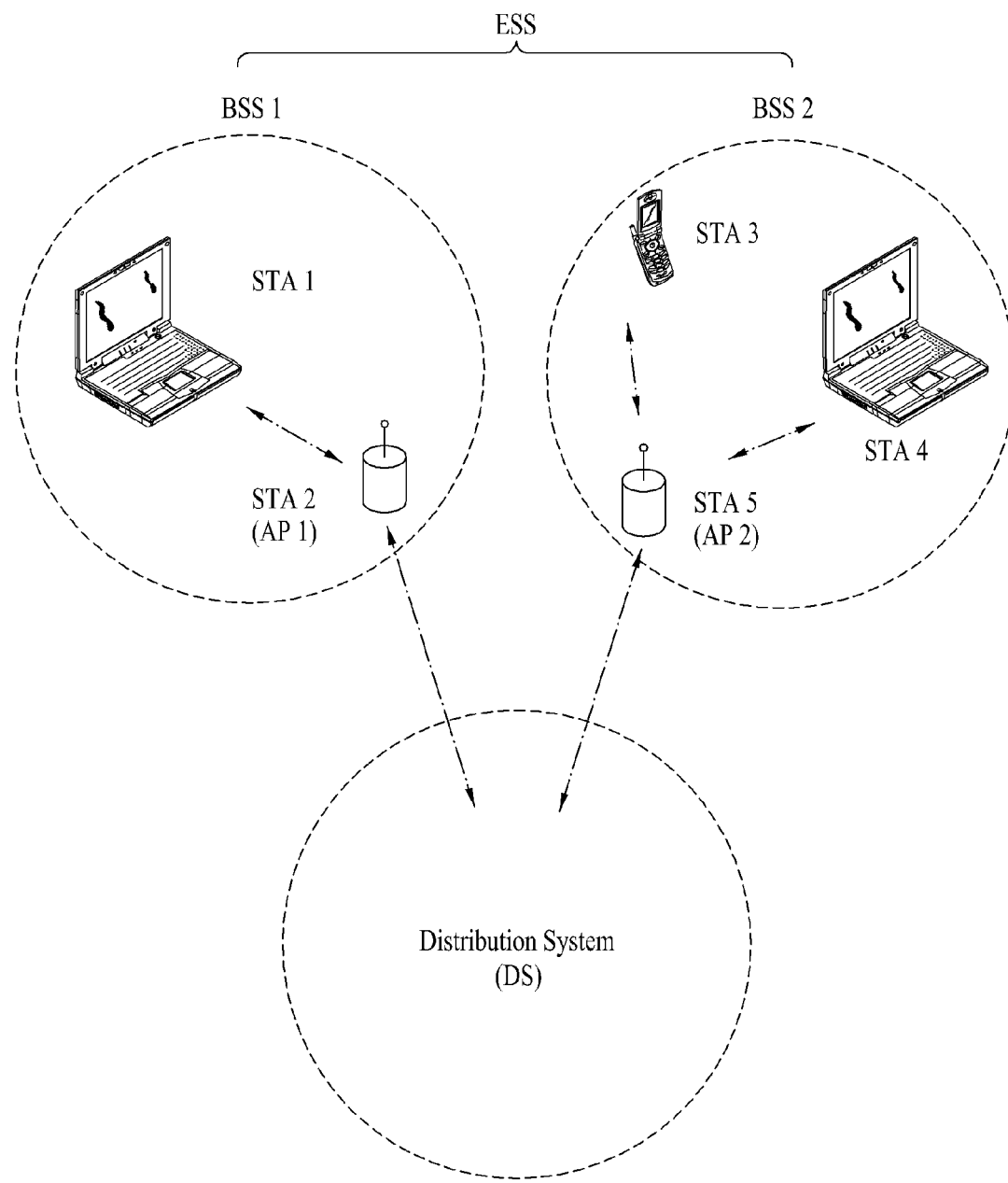
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc in other wireless communication fields.

Available Channel in Whitespace

For operation of an STA in whitespace, it is necessary to preferentially provide protection of a licensed device (or incumbent user). Accordingly, the STA needs to find an available channel that is not used by the licensed device and thus can be used by an unlicensed device and to operate on the available channel. If the channel used by the STA is no longer available, utilization of the channel is stopped.

To check channel (e.g. TV channel) availability in the whitespace (e.g. TVWS), the STA can perform spectrum sensing or access a GDB to find out a TV channel schedule. GDB information may include information on a specific channel use schedule (i.e. channel use time) of the licensed device at a specific position. The STA that wants to check availability of a TV channel needs to access the GDB through the Internet to acquire GDB information based on location information thereof. This operation needs to be performed at an interval sufficient to protect the licensed device.

In the specification, information on available channels and frequencies, received from the GDB, is called a whitespace map (WSM). The WSM is a map of information on channels available for unlicensed devices in the TVWS based on channel and frequency information obtained by an STA from the GDB. The WSM may include information on an available channel list or frequencies that can be used by unlicensed devices. Channels included in the available channel list are channels that are not used by signals (or users) that need to be legally protected and can be used by an unlicensed device when the unlicensed device accesses the GDB. When an unlicensed device requests an available channel after a predetermined lapse of time from when the unlicensed device accesses the GDB, the WSM may include information on channels and frequencies which are available from the corresponding time. Alternatively, when the unlicensed device requests an available channel to the GDB, it is possible to transmit information on available channels and frequencies by signaling channels that cannot be used by the unlicensed device.

FCC (Federal Communications Commission) TVWS regulations currently define two device types. That is, a personal/portable device with low power and a fixed device with high power, which operates at a fixed position. The fixed device may be referred to as a fixed STA and the personal/portable device may be referred to as a P/P STA. The fixed STA and P/P STA may correspond to normal STAs (that is, STAs including an AP and a non-AP) in the WLAN system. When the devices of two types operate in the TVWS, different operation rules may be applied thereto. The fixed device transmits/receives signals at a specific position that is not varied. The fixed device needs to access the GDB to acquire information on available channels to transmit a signal at the specific position. While the fixed device may include a positioning device such as a GPS, an installer can directly input the position of the fixed device to transmit the location information of the fixed device to the GDB. When the installer directly inputs the position of the fixed device, the fixed device is operated on the assumption that once the fixed device is installed and the position thereof is input, the position does not change. When the position of the fixed device is changed, the changed position needs to be registered. The fixed device may serve another fixed device of the same type and the P/P device. When the fixed device receives information on available channels from the GDB, the fixed device needs to transmit information on the device type thereof and receive information on available channels that can be directly used thereby. To serve the P/P device, the fixed device needs to additionally acquire information on available channels that can be used by the P/P device from the GDB or a proxy server connected to the GDB. This is because the fixed device and the P/P device use different channel intervals and operate with different maximum allowable transmit powers and different requirements for neighboring channels and thus the respective device types require different available channel lists. For example, the fixed device is permitted to transmit a signal at 512 to 608 MHz and 614 to 698 MHz as well as at 54 to 60 MHz, 76 to 88 MHz, 174 to 216 MHz and 470 to 512 MHz, whereas the P/P device is not allowed to transmit a signal in TVWS bands other than 512 to 608 MHz and 614 to 698 MHz. The fixed device can transmit a signal with higher power than the P/P device and up to 4 watts is permitted for the fixed device as effective isotropic radiated power (EIRP).

The P/P device can transmit/receive signals at a position that is not fixed and the position thereof can be changed. The P/P device can be carried by a person and mobility thereof cannot be predicted. The available frequency band of the P/P device is 512 to 608 MHz and 614 to 698 MHz and maximum transmit power thereof is 100 mW (EIRP). That is, the allowable transmit power of the P/P device is limited compared to the fixed device.

The P/P device can be categorized into a mode II device and a mode I device according to whether or not the P/P device has identification capability, that is, geo-location capability and capability of accessing the GDB through the Internet. The mode II device has geo-location capability and GDB access capability and can access the GDB to acquire information about available channels at the location thereof and then operate in the TVWS at the corresponding location. In addition, the mode II device can acquire the available channel information from the GDB and then initiate communication through a network by transmitting a signal (e.g. enable signal) for instructing communication to be initiated to the mode I device. The mode I device need not have the geo-location capability or GDB access capability and operates under the control of the mode II device or a fixed device. The mode I device can acquire available channel information from the mode II device of fixed device and needs to periodically check validity of available channels. In addition, the mode I device can be permitted to operate on an available channel upon confirmation of the device ID thereof. Here, the mode II device or fixed device may correspond to an enabling STA and the mode I device may correspond to a dependent STA. An enabling signal transmitted from the enabling STA to the dependent STA may correspond to a beacon frame.

A P/P device corresponding to the mode II device can provide a service to another P/P device or fixed device. In this case, the mode II P/P device can acquire available channel information for the fixed device from the GDB and deliver the available channel information to the fixed device.

The GDB can calculate available channel information at a location requested by an unlicensed device and transmit the information to the unlicensed device in consideration of a channel use schedule and protection contour of an incumbent user such as a DTV or microphone. Parameters considered by the GDB when the GDB calculates the available channel information include a device type, operation location, transmit power and spectrum mask. In the FCC regulations, whether or not to use a neighboring channel depends on device type. For example, when a DTV receiver is used on channel #30, the fixed device cannot use channels #29 and #31 even if channels #29 and #31 are not occupied but the P/P device can use the two channels. This is because the possibility that the fixed device interferes with a neighboring channel is high since the fixed device has high transmit power.

While exemplary embodiments of the present invention will be described hereinafter using the TVWS as an exemplary whitespace for convenience, the scope of the present invention is not limited thereto. That is, the scope of the present invention includes exemplary embodiments of the present invention, which are applied to operations in all whitespaces controlled by a DB that provides information on available channels at a specific position. For example, it is expected to permit operation of an unlicensed device, controlled by the GDB, in frequency bands that do not currently correspond to the whitespace but are expected to become whitespace and exemplary embodiments of the present invention applied thereto can be included within the scope of the present invention. Furthermore, while the principle of the present invention is described on the basis of FCC regulations for the TVWS, the scope of the present invention is not limited to operations in whitespace according to the FCC regulations and includes exemplary embodiments of the present invention, which are implemented on whitespaces conforming to other regulations.

Coexistence System

For coexistence of devices operating in a whitespace band, entities such as a coexistence manager (CM) and a coexistence enabler (CE) can be defined. The CM and CE are logical entities defined for coexistence of different wireless systems or wireless carriers which operate in an unlicensed manner in a whitespace band. While TVWS is exemplified in the following description, the scope of the present invention is applicable to operations in a normal whitespace band.

Figure 5:
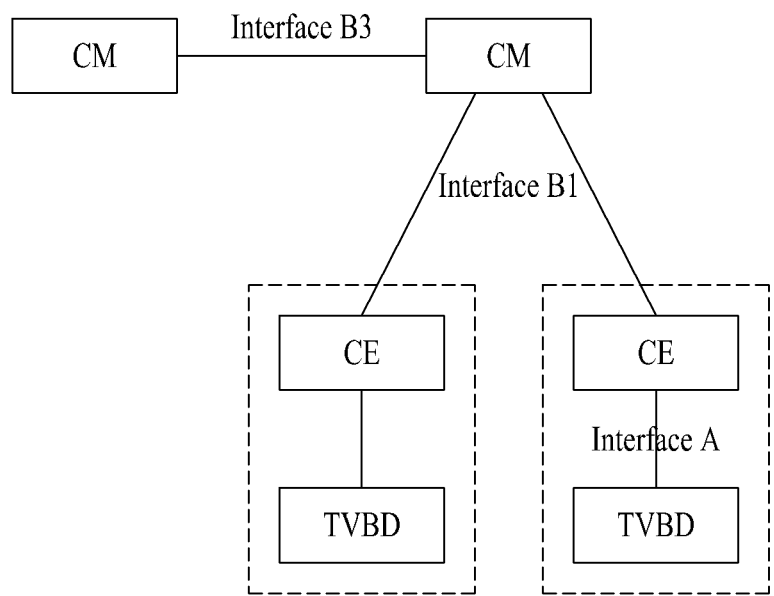
FIG. 5 illustrates an exemplary configuration of a coexistence system.

FIG. 5 illustrates an exemplary configuration of a coexistence system.

The CM is an entity which manages coexistence of different systems or carriers operating in TVWS. Specifically, the CM may provide a coexistence related policy, guidelines, etc. and perform resource allocation in order to solve interference between CEs connected thereto. The CM may have interface with a TVWS database.

The CE is an entity which has an interface (referred to as interface A) with a device operating in TVWS (TV band device; TVBD) and transmits information, commands, etc. received from the CM to the TVBD. In the present invention, STAs can execute functions of the CE, and a coexistence network structure in which a management entity such as CM is present as a higher entity capable of controlling a plurality of CEs is exemplified.

When the CE receives information or a command related to coexistence, the CE converts the information or command to media specific information or command and transmits the media specific information or command to the TVBD for TVBD operation corresponding to the information or command. Similarly, information received by the CE from the TVBD can be converted by the CE to a message defined in the coexistence system and transmitted to the CM. The CE can be located within the TVBD and a service access point (SAP) and a primitive with respect to a TVBD management entity need to be defined to transmit information or a command related to coexistence.

The CM can serve one or more CEs. In addition, the CM can acquire necessary information from an external entity such as the TVWS database, CE served thereby or another CM. The CM can exchange information or command messages with another CM or transmit information or a command to the CE served thereby. An interface between CMs is referred to as B3 and an interface between the CM and the CE is referred to as B1. The CM makes a coexistence decision based on acquired information. Coexistence decision may include determination of the operation channel of the CE served by the CM and a maximum transmit power value.

The TVBD may correspond to a device or network as an unlicensed user using the TV band. For example, the TVBD may be a device operating in a master mode, such as an AP or BS. The TVBD can operate in the master mode to communicate with the CM for coexistence and to manage and control devices operating in a slave mode.

To use a coexistence service, the CE establishes connection with the CM and registers with the CM. The CM also needs to establish connection with a neighboring CM. The CM manages CEs registered therein and provides the coexistence service. A topology in which the CM makes a coexistence decision while managing a plurality of CEs is referred to as centralized topology. Since a decision maker in the centralized topology is the CM, CEs follow the decision of the CM.

Operation Based on Neighboring Network Information

Figure 6:
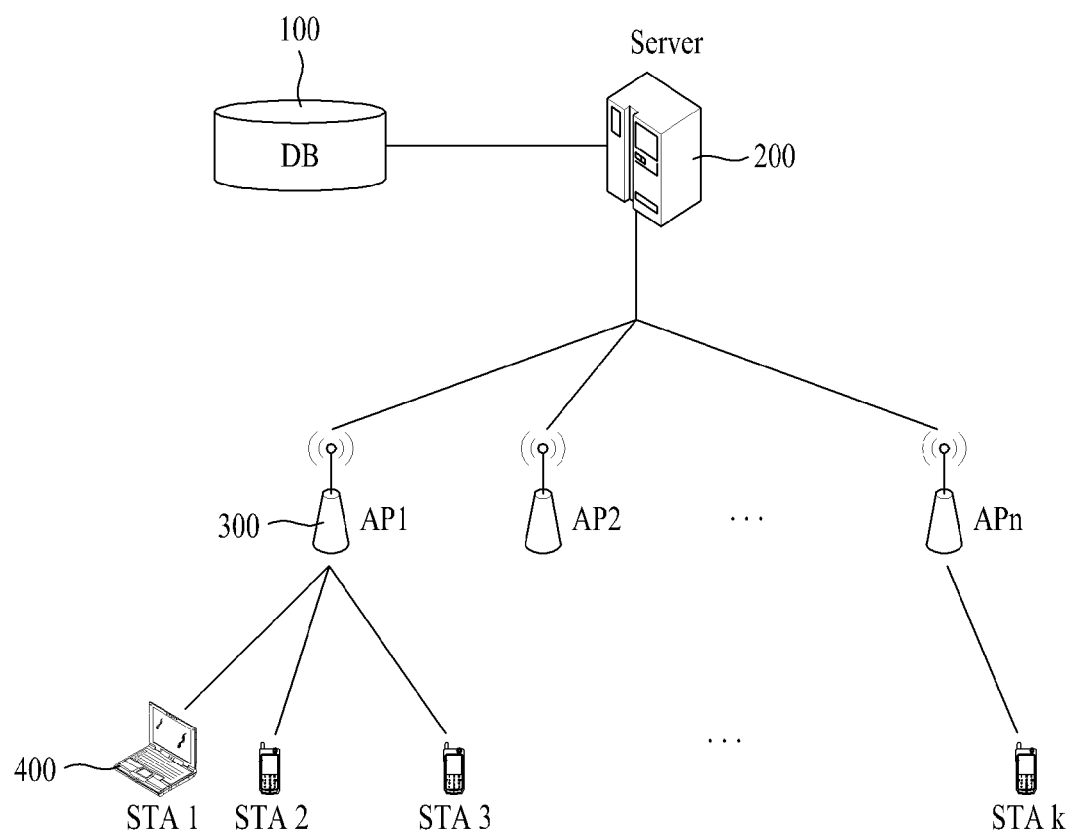
FIG. 6 illustrates an exemplary configuration of a system to which the present invention is applied.

FIG. 6 illustrates an exemplary configuration of a system to which the present invention is applied.

In FIG. 6, a DB 100 may correspond to the aforementioned GDB or TVWS database and store information on (available) channels on which unlicensed devices can operate in the whitespace band. A server 200 can have information about at least one AP 300 and manage operation of the AP 300. The server 200 may be located outside a BSS and directly connected to the external DB 100. The server 200 may include the DB 100. For example, the server 200 can correspond to a registered location secure server (RLSS). Furthermore, the server 200 may correspond to the CM shown in FIG. 5 and the AP 300 may correspond to the CE shown in FIG. 5. The AP 300 may serve one or more STAs 400.

For example, a plurality of APs 300 is installed in an office, campus, hotel, etc., and the DB 100 and the server 200 can manage operations of the APs 300 while separately having information on the APs 300. In the following description, the DB 100 and server 200 are referred to as an RLSS. That is, an entity which has information (locations, operation channels, operation transmit power, device IDs, BSS ID, etc.) on APs and STAs and controls operations of the APs and STAs is called an RLSS. However, the scope of the present invention is not limited thereto and the RLSS can be implemented as a database, a proxy server, a normal server or a logical entity. The RLSS may correspond to an STA operating in whitespace. In this case, the STA can have the authority to manage other APs and/or STAs. While RLSS operation (e.g. management of APs and/or STAs) is performed in TVWS in an embodiment of the present invention, the RLSS operation is not limited to TVWS.

In the case of TVWS, TVWS device operation needs to satisfy regulations of each country. The most basic regulation with respect to TVWS operation is maintenance of available channel information about unlicensed devices by a specific database in a TV band and acquisition of the available channel information from the database. For such regulation, the RLSS instead of an AP or STA may access the database.

When the RLSS manages a plurality of wireless LAN systems, a problem of coexistence of the wireless LAN systems can be solved. For example, information can be exchanged between overlapping BSSs (OBSSs) to remove or mitigate interference between the BSSs. To achieve this, while interference management may be performed through direct communication between APs, the RLSS may mediate communication between APs.

The present invention proposes a method through which an RLSS requests channel measurement to an AP in order to inform the AP of the most suitable operation channel and the AP performs channel measurement in response to the RLSS. Accordingly, the RLSS can collect channel measurement information about one or more APs or one or more STAs and determine appropriate operation channel information about each AP or STA in consideration of the channel measurement information. Operation channel state information about an AP or an STA becomes neighboring network information (NNI) for another AP or STA. That is, the RLSS can determine an appropriate operation channel for each AP or STA in consideration of NNI and determine appropriate transmit power information with respect to the operation channel.

The present invention proposes use of a generic advertisement service (GAS) protocol to allow an AP or STA to perform communication with the RLSS. Specifically, the AP or STA can use a registered location query protocol (RLQP) to communicate with the RLSS.

An STA supporting the GAS protocol can include an interworking element in a beacon frame, a probe response frame, etc. An advertisement protocol ID supported by the STA can be transmitted through an advertisement protocol element.

FIG. 7 illustrates an exemplary advertisement protocol information element format.

An advertisement protocol information element can be transmitted through a beacon frame, a probe response frame, etc.

In FIG. 7(a), the element ID field may include an ID corresponding to the advertisement protocol information element. The length field may be set to a value indicating the length of subsequent fields.

One advertisement protocol information element may include n advertisement protocol tuples. One advertisement protocol tuple may include a query response length limit field, PAME-BI (Pre-Association Message Exchange BSSID Independent) field and advertisement protocol ID field, as shown in FIG. 7(b). The query response length limit field indicates a maximum length of a query response. A PAME-BI bit indicates whether a query response (i.e. query response independent of BSSID (BSS identifier) used for GAS frame exchange) is returned for the corresponding advertisement protocol. The advertisement protocol ID field indicates an advertisement protocol supported by the corresponding STA.

Table 1 shows exemplary advertisement protocol ID values.

TABLE 1

| Name | Value |
| --- | --- |
| Access Network Query Protocol | 0 |
| MIH Information Service | 1 |
| MIH Command and Event Services | 2 |
| Capability Discovery | |
| Emergency Alert System (EAS) | 3 |
| Registered Location Query Protocol | 4 |
| Reserved | 5-220 |
| Vendor Specific | 221 |
| Reserved | 222-255 |

The present invention proposes definition of "RLQP" as a new advertisement protocol ID. That is, the advertisement protocol supports the RLQP. For example, 4, one of reserved values (4 to 220) from among the advertisement protocol ID values, can be defined to indicate RLQP. Here, 4 is an exemplary value and RLQP can be indicated by another specific value. For a detailed description of other advertisement protocol ID values, refer to IEEE 802.11 REVmb.

Figure 8:
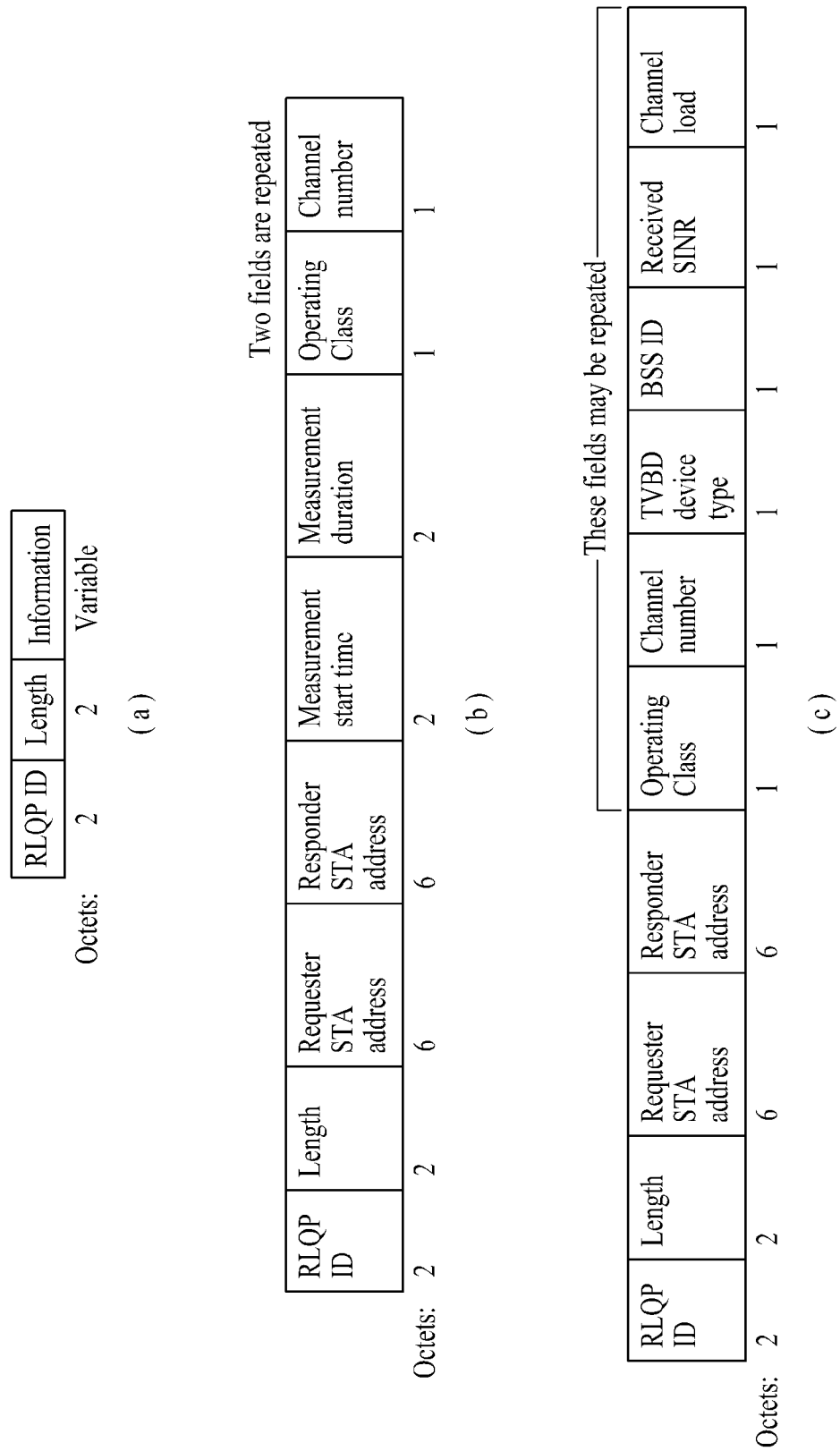
FIG. 8(a) illustrates an exemplary RLQP element format.
FIG. 8(b) illustrates an exemplary RLQP BSS measurement request frame format.
FIG. 8(c) illustrates an exemplary RLQP BSS measurement response frame format.

FIG. 8(a) illustrates an exemplary RLQP element format.

The RLQP element format may include the RLQP ID field, length field and information field.

Table 2 shows exemplary RLQP ID values.

TABLE 2

| Info Name | RLQP ID | RLQP Element (subclause) |
| --- | --- | --- |
| Reserved | 0-272 | N/A |
| RLQP Channel Power Management | 273 | |
| RLQP Channel Availability Query | 274 | |
| RLQP Network Channel Control | 275 | |
| RLQP Channel Schedule Management | 276 | |
| RLQP BSS measurement request | 277 | |
| RLQP BSS measurement response | 278 | |
| Reserved | 279-56796 | |
| RLQP Vendor Specific | 56797 | |
| Reserved | 56798-65535 | N/A |

The present invention proposes definition of "RLQP BSS measurement request" and "RLQP BSS measurement response" as new RLQP IDs. For example, 277, one of reserved values (277 to 56796) from among RLQP ID values can be defined to indicate the RLQP BSS measurement request and 288 can be defined to indicate the RLQP BSS measurement response. Here, 277 and 278 are exemplary values and the RLQP BSS measurement request and RLQP BSS measurement response can be indicated by other specific values. For a detailed description of other RLQP ID values, refer to IEEE 802.11af document.

When an RLQP ID corresponds to the RLQP BSS request, the corresponding RLQP element can be defined as a frame through which the RLSS requests measurement to a specific AP or STA.

FIG. 8(b) illustrates an exemplary RLQP BSS measurement frame format.

In FIG. 8(b), the RLQP ID field can be set to 277 corresponding to the RLQP BSS measurement request of Table 2. The length field can be set to a value corresponding to the length of subsequent fields.

In addition, the requester STA address field indicates the MAC address of an entity which transmits the corresponding RLQP BSS measurement request frame and the responder STA address field indicates the MAC address of an entity which performs measurement at the measurement request and provides a measurement result in response to the measurement request.

The measurement start time field indicates a time when requested measurement starts. When the measurement start time field is set to 0, measurement needs to start immediately upon reception of the request frame. The measurement duration field indicates a duration in which measurement is performed.

The operating class field and channel number field indicate a target channel for which requested measurement is performed. Here, the operating class functions as an index indicating one of sets of regulations applied to RF devices. For example, a set of regulations can be composed of a channel starting frequency, channel spacing, channel set and behavior limit set. That is, the operating class can be regarded as a predetermined channel group defined by a bandwidth and a channel number. Simply, the operating class can be considered to specify a group of channels following a predetermined regulation. A specific channel can be determined by a combination of the operating class and the channel number. Here, the channel number may be a TV channel number or the number of an operation channel (e.g. WLAN) on which a TVBD operates. When measurement with respect to a plurality of channels is requested, the operating class field and the channel number field can be repeated as many times as the number of measurement target channels.

While the operating class field and the channel number field are combined to indicate a specific channel in the specification, the scope of the present invention is not limited thereto. That is, operating class and channel number information is used as representative information indicating a channel (i.e. center frequency and channel bandwidth) on which an AP operates in the aforementioned and following embodiments, and various methods of indicating the position of a specific operation channel in the frequency domain and the bandwidth of the operation channel can be included in the scope of the present invention.

When an STA receives the RLQP BSS measurement request frame as shown in FIG. 8(b), the STA can perform measurement on the channel indicated (particularly, indicated by a channel number) by the frame. A channel measurement result can be transmitted to an STA (e.g. RLSS) which requests measurement through an RL QP BSS measurement response frame as shown in FIG. 8(c).

FIG. 8(c) illustrates an exemplary RLQP BSS measurement response frame format.

In FIG. 8(c), the RLQP ID field can be set to 278 which corresponds to the RLQP BSS measurement response in Table 2. That is, when RLQP ID corresponds to the RLQP BSS measurement response, the corresponding RLQP element can be defined as a frame through which the specific AP or STA which has performed measurement transmits the measurement result to the RLSS.

The length field can be set to a value corresponding to the length of subsequent fields.

The requester STA address field and the responder STA address field shown in FIG. 8(c) correspond to those of FIG. 8(b).

The operating class field and channel number field indicate a target channel for which measurement has been performed. A method of specifying a channel corresponds to the aforementioned method of specifying a channel using the operating class field and channel number field of FIG. 8(b) and thus description thereof is omitted. The TVBD device type field indicates the device type of an AP operating on the corresponding channel and the BSS ID field indicates the ID of a BSS composed by the AP. The received signal-to-interference plus noise ratio (SINR) field indicates SINR with respect to a signal transmitted from an AP of a specific device type, which has a specific BSS ID on the corresponding channel. The received SINR field may be replaced by information on transmit power used by the corresponding AP as necessary.

The channel load field indicates channel load information on the corresponding channel. For example, channel load information can be calculated on the basis of the proportion of busy time measured in a measurement interval in an 802.11 system. 1 octet may have a value in the range of 0 to 255 and a channel load may be represented by a value in the range of 0 to 255 according to the following equation 1.

$$\text{Channel Load} = \text{Integer} \times ((\text{channel busy time}/(\text{Measurement Duration} \times 1024)) \times 255) \quad \text{[Equation 1]}$$

In the aforementioned embodiment, the fields (i.e. operating class field to the channel load field) indicating measured channels, an AP for the channels and information on a signal received from the AP may be repeated as many times as the number of measured channels.

The RLQP BSS measurement response frame may be transmitted even when an STA (e.g. RLSS) does not send an RLQP BSS measurement request. In this case, the frame may be referred to as an unsolicited RLQP BSS measurement response frame.

Upon reception of a measurement result through the RLSS BSS measurement response frame, the corresponding RLSS may allocate an appropriate operation channel set which can be used by a specific AP at a specific position while avoiding interference from other BSSs as long as possible. The AP allocated the operation channel set may improve performance such as throughput of a BSS composed thereby by selecting the best channel on the basis of the operation channel set and increase resource utilization efficiency by coexisting with other BSSs through appropriate interference distribution.

The BSS, which is a measurement target, corresponds to a neighboring network composed of APs other than the APs related to the aforementioned request and response operations. In view of this, the BSS measurement request frame and the BSS measurement response frame shown in FIGS. 8(a) and 8(b) may be respectively referred to as a neighboring network measurement request frame and a neighboring network measurement response frame.

When an AP transmits an unsolicited measurement response frame to the RLSS, such operation may be interpreted as transmission of a complaint signal by the AP to the RLSS. Upon reception of such information, the RLSS may instruct the operation channel of the AP to be changed when interference and channel load due to a specific BSS are large in a specific channel. In this case, the RLSS may transmit a channel power management frame to the AP. The channel power management frame may include information indicating AP channel switching, power switching or simultaneous channel and power switching. For detailed information on the channel power management frame, refer to IEEE 802.11af document.

In an additional embodiment of the present invention, an AP may request neighboring network information (NNI) to the RLSS. The RLSS needs to know information on neighboring BSSs in advance in order to respond to the request from the AP. To achieve this, the AP may report network information thereof to the RLSS at the request of the RLSS or in an unsolicited manner.

For example, the RLSS may inquire about the channel and power currently used by the AP in order to collect network information on neighboring APs. According to an unsolicited method, the AP may report network information thereof to the RLSS even when the RLSS does not request the network information if the position or operation channel thereof is changed.

FIG. 9(a) illustrates an exemplary operation channel state request frame.

The information ID field may be set to a value corresponding to an operation channel state request. The length field may be set to a value indicating the length of subsequent fields. The query type field may be set to a value indicating a request of the RLSS. Information about a channel being used by the corresponding AP may be requested through the channel state request frame. If the RLSS wants to additionally request the position information of the AP, then the query type field may be set to a value indicating the additional request.

FIG. 9(b) illustrates an exemplary operation channel state response frame.

The information ID field may be set to a value corresponding to an operation channel state response. The length field may be set to a value indicating the length of subsequent fields. The operating class field and the channel number field indicate a specific channel. Here, the channel currently used by the AP may be indicated. The maximum transmit power field indicates a maximum transmit power level with respect to the corresponding channel. If position information on an AP is requested through the operation channel state request frame as shown in FIG. 9(a), the AP may add the position information thereof to the operation channel state response frame and transmit the operation channel state response frame including the position information. The position information on the AP may include information on the latitude, longitude and altitude of the AP.

In addition, the operation channel state response frame shown in FIG. 9(b) may be transmitted to the RLSS from the AP even when the RLSS does not send an operation channel state request, that is, in an unsolicited manner.

The RLSS may collect information about operation channels, maximum transmit power for the operation channels and positions of a plurality of APs through the operation channel request frame and the operation channel response frame. The RLSS may set the operation channel transmit power of each AP in consideration of the collected information, thereby providing a coexistence service with respect to the plurality of APs and improving resource efficiency.

When the RLSS is aware of the operation channels, transmit power and positions of the plurality of APs, the RLSS may appropriately respond to RLQP BSS information requests from the APs.

FIG. 10(a) illustrates an exemplary RLQP BSS information request frame.

An AP may transmit an RLQP BSS information request frame to the RLSS when the AP wants to change the operation channel thereof since the position thereof is changed or channel state is poor.

In FIG. 10(a), the information ID field may be set to a value indicating an RLQP BSS information request. The length field may be set to a value indicating the length of subsequent fields. The requester STA address may be set to the MAC address of the AP which transmits the RLQP BSS information request frame. The operating class field and the channel number field may be set to values specifying a target channel that the AP desires. The transmit power field needs to be less than maximum transmit power permitted by information from a database (e.g. GDB) and may be set to an estimated power value that the corresponding AP wants to use. The location field may be an option and be set to a value indicating the current location or a desired location (i.e. a specific location to which the AP attempts to move).

FIG. 10(b) illustrates an exemplary RLQP BSS information response frame.

Upon reception of the RLQP BSS information request frame from the AP, the RLSS may transmit an RLQP BSS information response frame to the AP. The AP may select a channel having minimum interference applied thereto using information included in the RLQP BSS information response frame upon reception of the RLQP BSS information response frame.

In FIG. 10(b), the information ID field may be set to a value indicating an RLQP BSS information response. The length field may be set to a value indicating the length of subsequent fields. The requester STA address field may be set to the MAC address of the AP which transmits the RLQP BSS information request frame. The status code field may include a value indicating success or failure of a requested operation.

In FIG. 10(b), the BSSID field, TVBD device type field, operating class field, channel number field and operating transmit power field may indicate transmit power (determined by the operating transmit power field) of a specific AP of a specific type (determined by the BSSID field and TVBD device type field) which operates on a specific channel (determined by the operating class field and channel number field). These fields may be repeated as determined by the length field.

In FIG. 10(b), the relative path loss field may indicate an estimated path loss value in dB on the assumption that relative transmission from a network (i.e. neighboring network) specified by the BSSID field to the requester STA (i.e. AP which has transmitted the BSS information request frame shown in FIG. 10(a)) is performed. The channel load field indicates channel load information on the corresponding channel.

In addition, the RLQP BSS response frame shown in FIG. 10(b) may be provided by the server even when the AP does not transmit the request.

The RLQP BSS information request frame and the RLQP BSS information response frame shown in FIGS. 10(a) and 10(b) may respectively correspond to an NNI query frame and an NNI response frame. That is, an AP can request NNI to the RLSS using the frame shown in FIG. 10(a) and the RLSS can provide the NNI to the AP using the frame shown in FIG. 10(b) in response to the request from the AP. Accordingly, it is possible to provide a coexistence service with respect to a plurality of APs managed by the RLSS, reduce interference and determine an appropriate operation channel transmit power of each AP.

Figure 11:
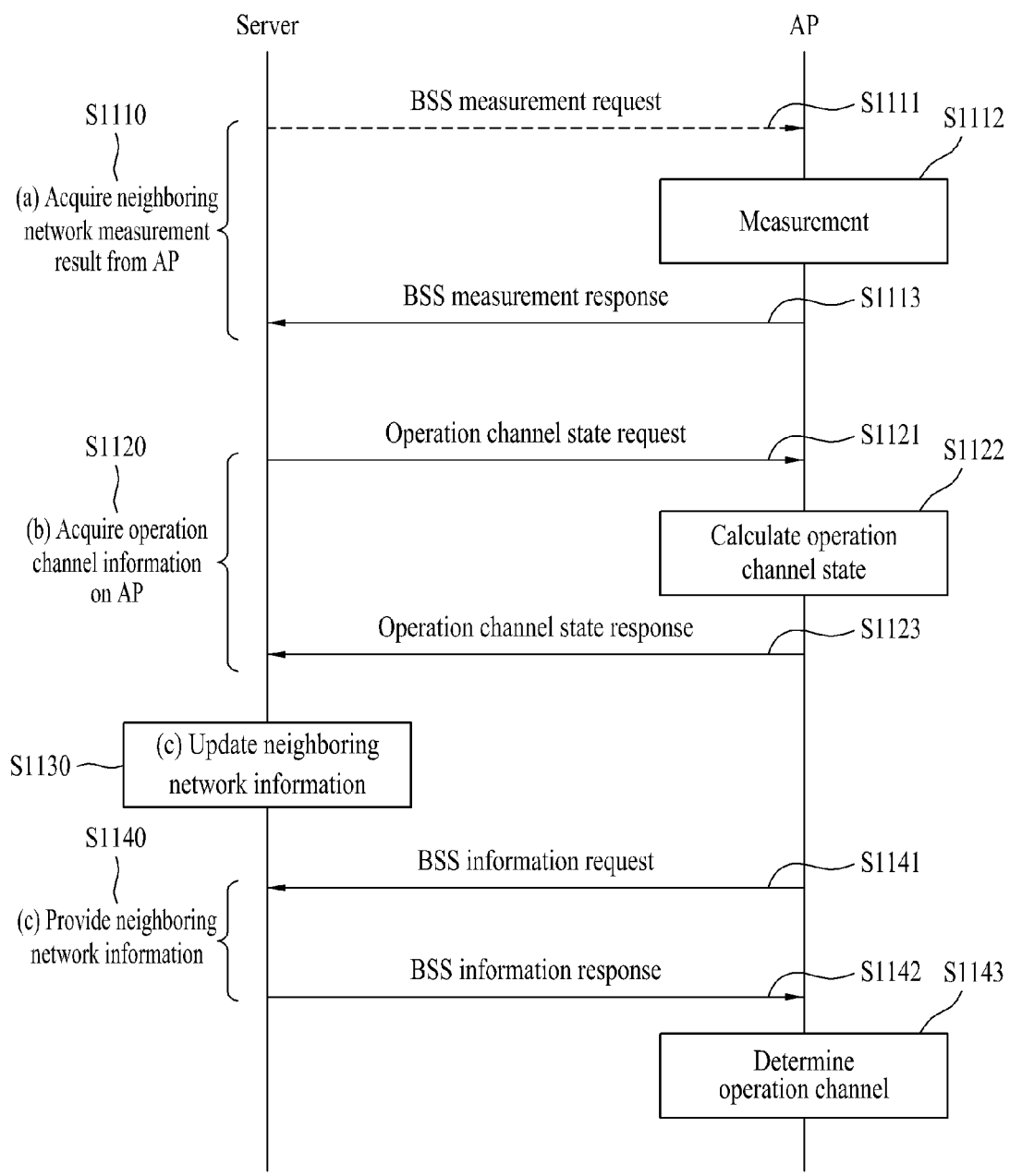
FIG. 11 is a flowchart illustrating a method for providing a coexistence service according to an embodiment of the present invention.

FIG. 11 is a flowchart illustrating a method for providing a coexistence service.

The method shown in FIG. 11 may include a step (a) in which a server (e.g. RLSS) acquires NNI measured by an AP (S1110), a step (b) in which the server acquires information on a channel on which the AP operates (S1120), a step (c) in which the server updates the NNI and the channel information obtained in steps S1110 and S1120 (S1130) and a step (d) in which the server provides the NNI to the AP (S1140). However, the present invention is not limited to sequential execution of steps (a) to (d) and may include execution of only some or at least one of steps (a) to (d).

In step S1110, the server may transmit a BSS measurement request frame (refer to FIG. 8(b)) to the AP (S1111) and the AP may measure a designated BSS (S1112) and report the measurement result to the server through a BSS measurement response frame (refer to FIG. 8(c)) (S1113). Here, step S1113 may be performed even when step S111 is not carried out.

In step S1120, the server may transmit an operation channel state request frame (refer to FIG. 9(a)) for inquiring about operation channel state of the AP to the AP (S1121) and the AP may calculate the operation channel state thereof (S1122) and report the result to the server through an operation channel state response frame (refer to FIG. 9(b)) (S1123). Here, step S1123 may be performed even when step S1121 is not carried out.

In step S1130, the server may collect NNI and operation channel state information from a plurality of APs, and store and maintain the collected information. Accordingly, the server can make a decision necessary for the coexistence service in consideration of results of measurement of networks corresponding to the plurality of APs and operation channel states of the networks. For example, the server can determine an operation channel and transmit power limit information with respect to a specific AP in consideration of the NNI of the AP In step S1140, the AP may transmit a BSS information request frame (refer to FIG. 10(a)) to the server (S1141) and the server may transmit information about a corresponding BSS through a BSS information response frame (refer to FIG. 10(b)). The AP may appropriately determine an operation channel and transmit power thereof on the basis of the acquired NNI (S1143).

The above-described embodiments of the present invention can be independently applied or two or more embodiments can be simultaneously applied.

Figure 12:
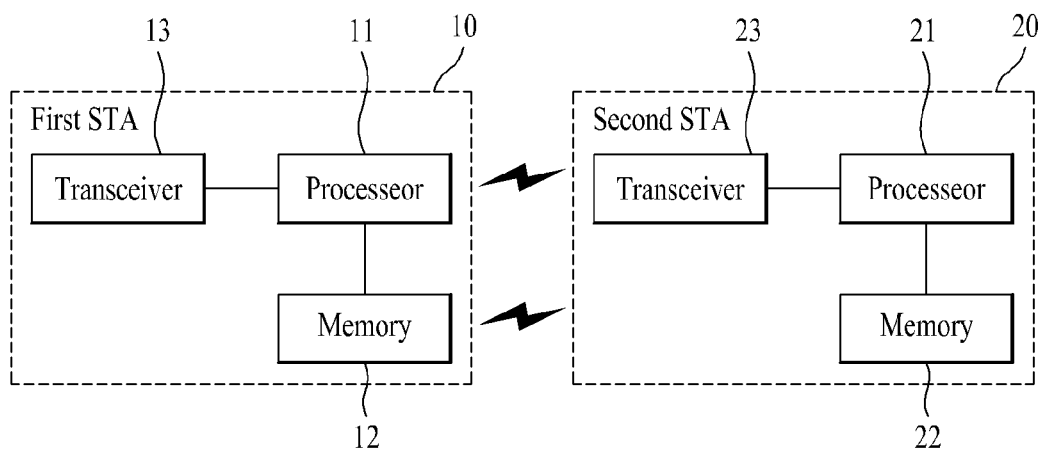
FIG. 12 is a block diagram of an RF device according to an embodiment of the present invention.

FIG. 12 is a block diagram of an RF device according to an embodiment of the present invention.

A first STA 10 may include a processor 11, a memory 12 and a transceiver 13. A second STA 20 may include a processor 21, a memory 22 and a transceiver 23. The transceiver 13 and 23 can transmit/receive radio signals and implement a physical layer according to IEEE 802, for example. The processors 11 and 21 can be connected to the transceivers 13 and 23 to implement the physical layer and/or an MAC layer according to IEEE 802. The processors 11 and 21 can be configured to perform operations according to the above-described embodiments of the present invention. Modules for implementing operations of the first and second STAs according to the above-described embodiments of the present invention can be stored in the memories 12 and 22 and executed by the processors 11 and 21. The memories 12 and 22 can be included in the processors 11 and 21 or provided outside the processors 11 and 21 and connected to the processors 11 and 21 through known means.

The first STA 10 according to an embodiment of the present invention can be configured to provide NNI to the second STA 20. The processor 11 of the first STA 10 can be configured to receive an NNI request frame from the second STA 20 using the transceiver 13. The processor 11 of the first STA 10 can be configured to transmit an NNI response frame to the second STA 20 using the transceiver 13. In addition, the processor 11 can be configured to receive a neighboring network measurement request frame from the second STA 20 using the transceiver 13. The processor 11 can be configured to transmit a neighboring network measurement response frame to the second STA 20 through the transceiver 13. Furthermore, the processor 11 can be configured to transmit an operation channel state request frame to the second STA 20 using the transceiver 13. In addition, the processor 11 can be configured to receive an operation channel state response frame from the second STA 20 through the transceiver 13.

The second STA 20 according to an embodiment of the present invention can be configured to receive NNI from the first STA 10. The processor 21 of the second STA 20 can be configured to transmit an NNI request frame to the first STA 10 using the transceiver 23. The processor 21 of the second STA 20 can be configured to receive an NNI response frame from the first STA 10 using the transceiver 23. In addition, the processor 21 can be configured to receive a neighboring network measurement request frame from the first STA 10 using the transceiver 23. The processor 21 can be configured to transmit a neighboring network measurement response frame to the first STA 10 through the transceiver 23. Furthermore, the processor 21 can be configured to receive an operation channel state request frame from the first STA 10 using the transceiver 23. In addition, the processor 21 can be configured to transmit an operation channel state response frame to the first STA 10 through the transceiver 23.

The configuration of the first STA 10 and the second STA 20 can be implemented such that the above-described embodiments of the present invention are independently applied or two or more embodiments are simultaneously applied and descriptions of redundant parts are omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described embodiments of the present invention focus on IEEE 802.11, they are applicable to various mobile communication systems in the same manner.

The invention claimed is:

1. A method for a first station (STA) to provide neighboring network information (NNI) to a second STA, the method comprising:
   receiving an NNI request frame from the second STA when the second STA moves to a target channel based on a position and a channel state; and
   transmitting an NNI response frame to the second STA,
   wherein the NNI request frame comprises first information related to the second STA,
   wherein the first information comprises:
      a value specifying the target channel,
      an address of the second STA, and
      an estimated transmit power of the target channel, and
   wherein the estimated transmit power is set to a power less than a maximum transmit power permitted by second information from a database.

2. The method according to claim 1, wherein the the first information further comprises at least one of: an address of a requester STA, a status code, a BSS ID (basic service set identifier), a device type, an operating class, a channel number, an operating transmit power, and a relative path loss.

3. The method according to claim 1, further comprising receiving a neighboring network measurement response frame from the second STA.

4. The method according to claim 3, wherein the neighboring network measurement response frame comprises at least one of: an address of a requester STA, an address of a responder STA, an operating class, a channel number, a device type, a BSS ID, a signal-to-interference plus noise ratio of a received signal, and a channel load.

5. The method according to claim 3, wherein the neighboring network measurement response frame is transmitted as a response to a neighboring network measurement request frame transmitted from the first STA to the second STA.

6. The method according to claim 5, wherein the neighboring network measurement request frame comprises at least one of: an address of a requester STA, an address of a responder STA, a measurement start time, a measurement duration, an operating class, and a channel number.

7. The method according to claim 1, further comprising receiving an operating channel state response frame from the second STA.

8. The method according to claim 7, wherein the operation channel state response frame comprises at least one of: an operating class, a channel number, a maximum transmit power, and a location.

9. The method according to claim 7, wherein:
   the operation channel state response frame is transmitted as a response to an operation channel state request frame transmitted from the first STA to the second STA; and
   the operation channel state request frame comprises a query type field.

10. The method according to claim 1, wherein the NNI request frame and the NNI response frame are transmitted or received using a registered location query protocol (RLQP).

11. The method according to claim 1, wherein:
   the first STA is a registered location secure server (RLSS); and
   the second STA is an access point (AP).

12. A method for a second STA to receive NNI from a first STA, the method comprising:
   transmitting an NNI request frame to the first STA when the second STA moves to a target channel based on a position and a channel state; and
   receiving an NNI response frame from the first STA,
   wherein the NNI request frame comprises first information related to the second STA,
   wherein the first information comprises:
      a value specifying the target channel,
      an address of the second STA, and
      an estimated transmit power of the target channel, and
   wherein the estimated transmit power is set to a power less than a maximum transmit power permitted by second information from a database.

13. A first STA providing NNI to a second STA, comprising:
   a transceiver configured to perform transmission/reception to/from other devices; and
   a processor configured to control the first STA comprising the transceiver;
      receive an NNI request frame from the second STA using the transceiver when the second STA moves to a target channel based on a position and a channel state; and
      transmit an NNI response frame to the second STA using the transceiver,
   wherein the NNI request frame comprises first information related to the second STA,
   wherein the first information comprises:
      a value specifying the target channel,
      an address of the second STA, and
      an estimated transmit power of the target channel, and
   wherein the estimated transmit power is set to a power less than a maximum transmit power permitted by second information from a database.

14. A second STA receiving NNI from a first STA, comprising:
   a transceiver configured to perform transmission/reception to/from other devices; and
   a processor configured to:
      control the second STA comprising the transceiver;
      transmit an NNI request frame to the first STA using the transceiver when the second STA moves to a target channel based on a position and a channel state; and
      receive an NNI response frame from the first STA,
   wherein the NNI request frame comprises first information related to the second STA,
   wherein the first information comprises:
      a value specifying the target channel,
      an address of the second STA, and
      an estimated transmit power of the target channel, and
   wherein the estimated transmit power is set to a power less than a maximum transmit power permitted by second information from a database.

* * * * *